United States Patent [19]

Suzuki et al.

[11] Patent Number: 4,499,451
[45] Date of Patent: Feb. 12, 1985

[54] MIRROR

[75] Inventors: Yasutoshi Suzuki, Oubu; Kunihiko Hara, Aichi; Ryo Sato, Kariya, all of Japan

[73] Assignee: Nippondenso Co., Ltd., Kariya, Japan

[21] Appl. No.: 364,633

[22] Filed: Apr. 2, 1982

[30] Foreign Application Priority Data

Apr. 7, 1981 [JP] Japan .................. 56-52022
Apr. 15, 1981 [JP] Japan .................. 56-57472

[51] Int. Cl.$^3$ .......................... B60Q 1/00; G08B 5/00
[52] U.S. Cl. .......................... 340/98; 340/97; 340/286 R; 340/760; 340/781; 340/815.06; 350/283
[58] Field of Search ............ 340/98, 97, 101, 113, 340/760, 781, 286 R, 286 M, 815.06, 815.07; 350/101, 283, 284

[56] References Cited

U.S. PATENT DOCUMENTS

| | | | |
|---|---|---|---|
| 2,580,014 | 12/1951 | Gazda | 340/98 |
| 3,317,906 | 5/1967 | Baldridge | 340/97 |
| 3,461,346 | 8/1969 | Lilly | 315/276 |
| 3,829,196 | 8/1974 | Deb | 340/97 |

FOREIGN PATENT DOCUMENTS 396789  8/1933  United Kingdom ............ 340/98

*Primary Examiner*—Donnie L. Crosland
*Attorney, Agent, or Firm*—Cushman, Darby & Cushman

[57] ABSTRACT

A mirror arrangement including a transparent glass member, a translucent film behind the glass member, a light generating element having a configuration for conveying information when activated, the mirror arrangement functioning as an ordinary mirror when no voltage is applied to the light generating element such as an electroluminescent element while functioning as a light source or display panel when the voltage is applied to the light generating element, since the element energized emits light through the translucent aluminum film and the glass in front.

6 Claims, 2 Drawing Figures

MIRROR

BACKGROUND OF THE INVENTION

The present invention relates to a mirror which also works as a light source or an image projector.

In ordinary vehicles, there are provided a rear view interior mirror, a room lamp and various display panels in the compartment to suffice various demands of the driver and the passengers. The dashboard is crowded with the display panels for giving various information to the driver and it is becoming difficult to find an extra space in the compartment for further information.

SUMMARY OF THE INVENTION

In the present invention, it is aimed to obtain a rear view interior mirror which works as an ordinary rear view mirror and also as a general light source or display panel. The main components of the present invention are a translucent thin reflecting film back on the transparent glass and an electroluminescence element secured next to the translucent thin reflecting film. When the element lights, the mirror works as a general light source or a display panel, since the light emitted projects through the translucent thin reflecting film. It maintains the function of an ordinary mirror when the electroluminenscence element does not light, since the light in circumstances enters into the mirror and partially reflected by the translucent reflecting film. Therefore the mirror, especially rear view interior mirror of this kind, is very useful in vehicles where no extra space for displaying information is available. Since the interior mirror is in the sight of the driver, it is very easy for him to perceive or read the information displayed on it. If it is designed that the whole mirror emits light, it may be used as a light source to read a book in the compartment. It may also be useful to apply the idea to the rear view exterior mirror. Although the primary purposes of the present invention is to suffice the need with respect to the vehicles, it is also applicable to other mirrors for other use than vehicles.

DESCRIPTION OF THE PREFERRED EMBODIMENT

Figure 1:
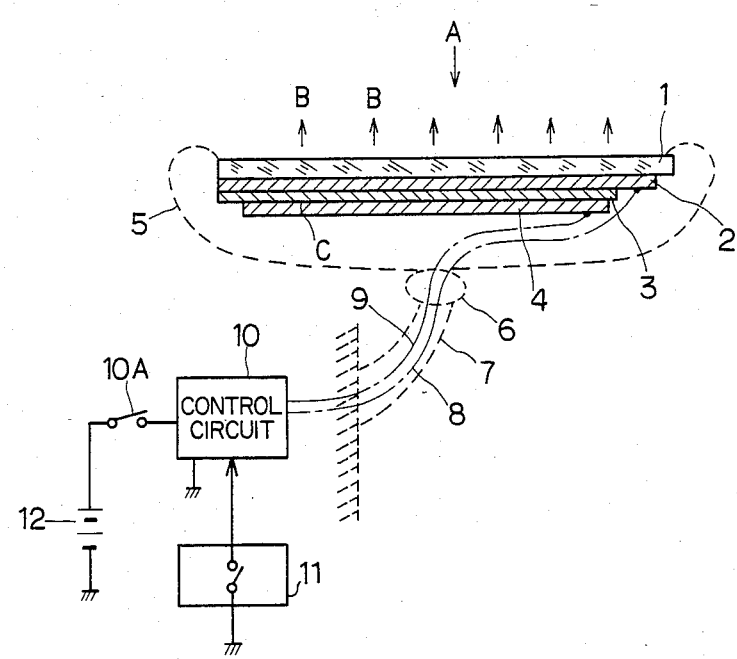
FIG. 1 is a partial cross-sectional view of an embodiment of the present invention, and, FIG. 2 is a front view of the mirror of the present invention.

Numeral 1 in the drawing shows a transparent glass member forming a face of a rear view interior mirror. On the glass member 1 there is provided a thin reflecting aluminum film 2 of the thickness of about 50 angstroms to about 200 angstroms, preferably about 100 angstroms. In this embodiment the thickness is selected as about 130 angstroms. The aluminum thin film 2 is fixed to cover the glass member by the vacuum-deposition method. An electroluminescence element 3 is printed on the aluminum reflecting film 2 to cover the same and then fired. The electroluminescence element 3 is of planar plastic type whose components are zinc sulfide, copper and aluminum mixed with cyanoethylcellulose. In this case the element emits green light. To obtain blue light iodine powder must be added instead of aluminum. The thickness of the element 3 is in the order of about 40 microns. On the electroluminescence element 3 is there provided an electrode 4 which is of a conductive metal and has a thickness in the order of about 10 microns. A paste of silver is used as the electrode in this embodiment, which after printing is fired to cover the element 3. Although the electrode 4 can be fixed to the electroluminescence element 3 directly, it is possible and sometimes preferable to put an intervening insulation layer between the element 3 and the electrode 4 at the location indicated C. If the insulation layer is provided, the durability of the electroluminescence element is improved. In this case the insulation layer should be white so as not to make the layer conspicuous out of the reflecting thin film of aluminum 2. The insulation layer should be in the range of about 10 to 40 microns thick and of a mixture of barium titanate and cyanoethylcellulose.

The reflecting thin film of aluminum 2 of about 130 angstroms shows translucent characteristic against the incoming light and the electroluminescence element 3 has solid and nontransparent characteristic. Therefore when the light comes in and one looks from the direction of arrow A, it works as an ordinary mirror. On the other hand when the electroluminescence element 3 is energized via a couple of electrodes, the reflecting film 2 and the electrode 4, the light emitted by the element 3 passes through the thin film of aluminum 2 and the glass member 1, thereby playing a roll of plane light source to emit light into the direction of arrow B.

The mirror thus composed is fixed to a housing 5 so as to expose the face of the mirror into the compartment. The housing 5 is connected with a support member 7 via a joint 6, thereby to be mounted on the ceiling of a vehicle. Lead wires 8 and 9 which transmit electrical signals to the reflecting thin film of aluminum 2 and the electrode 4 are routed through the supporting member 7 to the body of the vehicle so as to be connected with a control circuit 10. The control circuit 10 is supplied with the power from a battery 12 upon a closure of the main switch 10A, and works when the command switch 11 is closed to produce and supply the required voltage to the element 3 to operate it.

Figure 2:
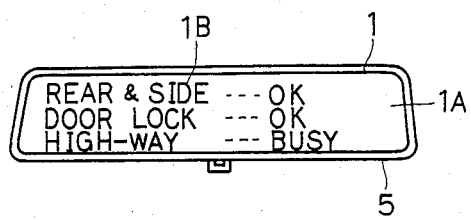

When the electrode 4 is designed to cover the whole area of the mirror, the mirror works as a general light source. When the electrode 4 is designed and shaped to indicate a particular meaning such as the ones shown in FIG. 2, it works as a display panel when energized. Since the interior mirror is in the sight of the driver, it is very convenient and easily recognizable when it projects some cautionary marks or phases. In FIG. 2 numeral 1B shows portions illuminated while numeral 1A shows portions of ordinary mirror.

It is possible to select other materials than the ones disclosed for the reflecting thin film and the electroluminescence element. Also the electroluminescence element 3 may be vacuum-deposited on the reflecting thin film of aluminum 2 to obtain smaller and lighter mirror. It is also possible to shape the mark or letters by so shaping the electroluminescence element 3 itself instead of shaping the electrode 4 as above mentioned.

What we claim is:

1. A mirror arrangement comprising: a transparent glass member, translucent electrode means fixed to cover one side of said transparent glass member for reflexing part of light coming through said glass member and passing at the same time the remaining light therethrough, a planar light emitting element, fixed to said translucent electrode means, for emitting light upon application thereto of a voltage so as to project light through said translucent electrode means and said transparent glass member, and an electrode fixed to cover said light emitting element said electrode and translucent electrode means for applying said voltage to said light emitting element, whereby the arrangement works as an ordinary mirror when no voltage is applied and as a light source when the voltage is applied.

2. A rear view mirror arrangement for vehicles comprising: a transparent glass member, a translucent thin film of aluminum secured to cover one side of said transparent glass member for reflexing part of light coming through said glass member and at the same time passing the remaining light therethrough, a planar light emitting element secured to said thin film, and an electrode secured to cover said light emitting element for applying voltage to said element so as to energize the element, whereby the light emitting element emits light through said thin film and said transparent glass member upon application of said voltage so that the mirror arrangement works as a light source when the voltage is applied and as an ordinary rear view mirror when no voltage is applied.

3. A mirror as claimed in claim 1 or 2, wherein the light emitting element is shaped in a particular form which has a particular meaning to be displayed.

4. A mirror as claimed in claim 1 or 2, wherein the electrode is shaped in a particular form which has a particular meaning so that the light emitting element emits light in the shape of the electrode.

5. A rear view mirror arrangement for vehicles comprising: a transparent glass member, a translucent thin film of aluminum deposited on one side of said transparent glass member to cover the same for reflecting part of light coming through said glass member and passing at the same time the remaining light therethrough, an electroluminescence element printed on said reflecting thin film of aluminum to cover the same for emitting light upon application of voltage thereto so as to project light through said thin film of aluminum and said glass member, and an electrode fixed to cover said electroluminescence element in a meaningful shape thereby to apply the voltage with said thin film of aluminum to said electroluminescence element, whereby said mirror arrangement works as an ordinary mirror when no voltage is applied and as a display panel of particular meaning when the voltage is applied to said electroluminescence element.

6. A mirror arrangement comprising:
a transparent glass member;
a thin film of translucent layer deposited on one whole surface of said glass member in complete contact relation therewith for uniformly reflecting and passing part of light applied thereto; and
light generating means having a light emitting portion that is shaped in a form of information to be conveyed, disposed only behind the translucent layer for uniformly emitting information carrying light therefrom upon application of a voltage thereto, said mirror arrangement functioning as an ordinary mirror when said light generating means is not activated, the light generating means not being visible, and functioning to display said information when said light emitting means is activated by said voltage.

* * * * *